Patented Apr. 29, 1947

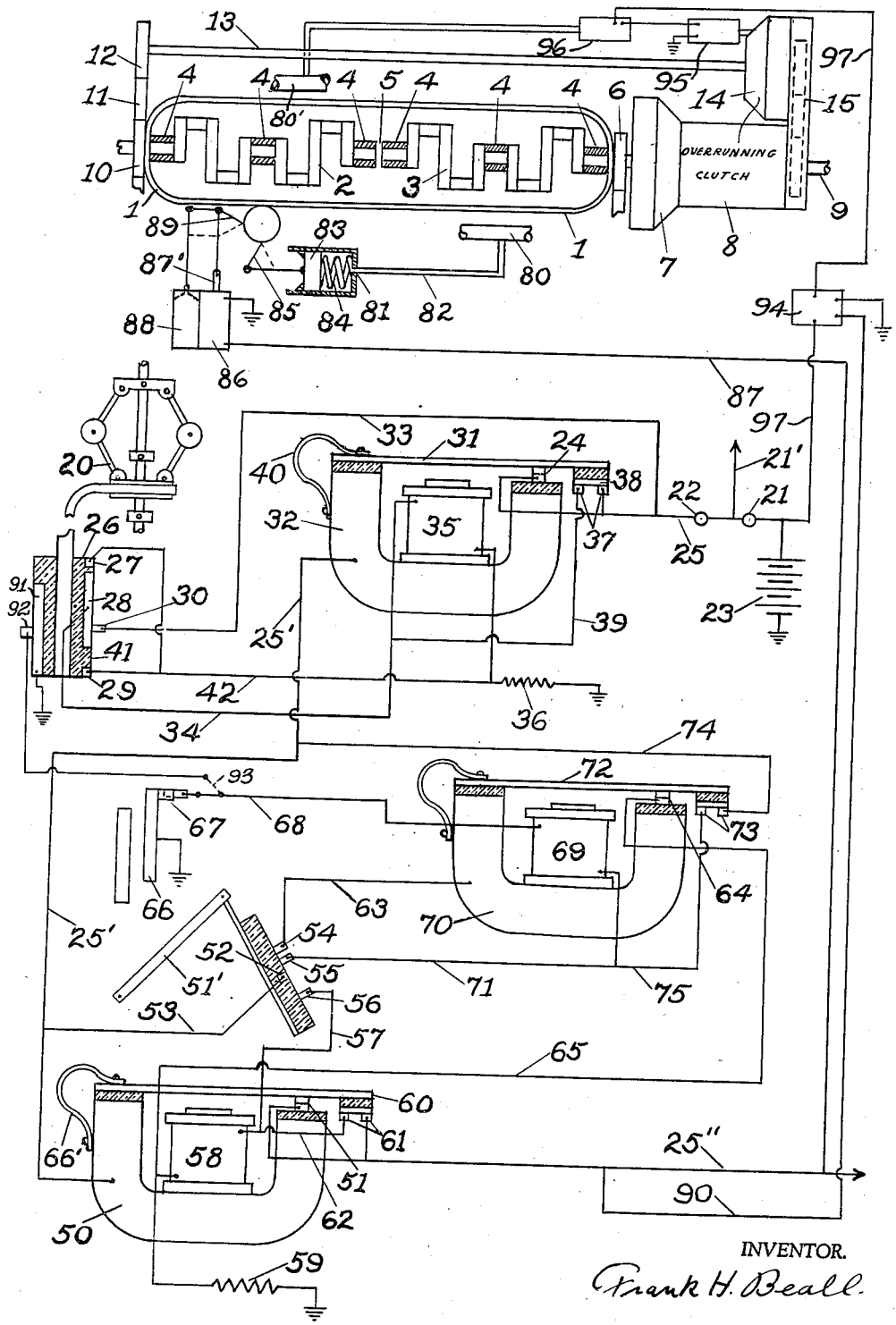

2,419,811

UNITED STATES PATENT OFFICE 2,419,811

DUAL ENGINE POWERED MOTOR VEHICLE AND CONTROL MECHANISM THEREFOR

Frank H. Beall, Detroit, Mich.

Application January 21, 1941, Serial No. 375,314

17 Claims. (Cl. 180—54)

The trend in automobile practice is towards the use of higher octane gasoline giving more power per gallon and today engines have the highest compression ratios in history.

In 1925 automobiles averaged about 60 horsepower and had compression ratios of 4.34 and used fuels of about 55 octane rating.

In each succeeding year all three of these factors have moved up until today's current models average about 115 horsepower and have compression ratios of 6.66 and the regular grade of gasoline has an octane value of about 75.

This results in the fact that even the lowest price cars of today can outrun even the highest price car of 1925 and carry the motorist over steep hills without the necessity of gear shifting.

A still further increase in the octane rating is desirable even at an increase in the unit cost of gasoline. It has been estimated that an increase to 100 octane gasoline would, in an engine designed for its use, give an increase of 40% in mileage at reasonably high speeds and probably a 20% savings in cost per mile when the higher fuel cost is taken into account. This is, of course, if the increase in efficiency was accompanied by no increase in average horsepower over that used today.

The increase in horsepower to date over the cars of 1925 has largely neutralized the gain in efficiency obtained with the use of the present higher octane gasoline.

For instance, one of the standard models of the larger cars has been equipped with a 165 horsepower engine to obtain more pick-up and easier car handling through less frequent need for gear shifting.

At 20 miles an hour this car uses only 7.4% of its available power, at 30 miles per hour only 9.7% of its power, and at 50 miles an hour it uses less than one-sixth of its power. The balance of the power is in reserve for acceleration and for pull on the hills or in rough going.

Even at a 25% load the gas consumption is about two-thirds greater than at full load per horsepower output.

One object of this invention is to have this desirable reserve of power in the form of an auxiliary or booster engine normally at rest, but to be ready at all times to supply its power to the driving engine whenever necessary and instantly.

Second, this booster engine could be made to operate over a range of speed of say, 10 to 70 miles per hour, while the main engine operates over a range of 0 to 90 miles per hour. The booster would be geared to be operating at its maximum speed at the cut-off point. If two engines of 72¼ horsepower were used the stepped-up torque of the booster added to that of the main engine would give the equivalent power of the 165 horsepower engine between the 10 and 70 miles per hour.

Since most of the driving calls for a power less than one-third of the 165 horsepower or 55 horsepower, this latter figure would be 76% of full load on the 72¼ horsepower motor instead of a 33% load on the 165 horsepower motor with a corresponding substantial decrease in fuel consumption per horsepower used.

Also, since the combined torque of the two engines will not be used on low gear, the driving train can be correspondingly lightened.

A third object of this invention is to retain the present location of the engine. This is accomplished by dividing the crank shaft of the engine so as to have say, four cylinders drive each half, taking the power from each end of the engine. The power from the four rear cylinders will be transmitted through the clutch and gear box in the normal way while the power from the front four cylinders will be geared to an auxiliary shaft including an over-running clutch and then geared to the propelling means at the transmission.

Other and further important objects of this invention will be apparent from the disclosures in the specification and the accompanying drawings.

On the drawings:

In the drawing there is shown the divided crankshaft of an engine arranged to separately deliver their power from both ends and the automatic control system for the operation of the booster component of the engine. This system is a modification of the control shown in my co-pending application Serial Number 287,424, filed July 29, 1939.

In the drawing the crankcase is shown at 1 containing two crank shafts 2 and 3 with bearings shown at 4. The two shafts are separated at 5 and four cylinders with a firing order of 1, 2, 4, 3 drive each shaft. As shown, crankshaft 3 is that of the main engine and crankshaft 2 is that of the booster engine.

Crankshaft 3 has mounted thereon the timing gear 6 and is then connected to the clutch indicated at 7. From the clutch the power is transmitted through the gearbox 8 to the propeller shaft 9 for transmitting the power to the rear axle in the normal way.

Crankshaft 2 has mounted thereon timing gear 10. Also geared to this gear 10 is an idler gear 11 driving gear 12 mounted on shaft 13. The other end of shaft 13 is connected to an over-running or one way clutch indicated at 14. The other side of this clutch is connected through gears indicated generally at 15 to the driven shaft for the transmission of the power to the driving wheels. The use of an overrunning clutch allows the booster engine to slow down and stop while the car is in operation and on starting, the booster is allowed to come up to synchronous speed with the driven shaft before being operatively clutched for driving the vehicle.

While the power from the forward crankshaft 2 is shown connected to the driven shaft of gear box 8, as pointed out in my copending application, Ser. No. 287,424, it is obvious it could be connected to any convenient point to the driving means to drive the vehicle.

The cylinders operating crankshaft 3 are controlled in the usual way and normal driving will be by these cylinders acting as a normal four cylinder engine.

The booster control system consists of a governor 20 driven from the driven shaft or any engine driven part, but preferably some part that operates at a speed proportional to vehicle speed. This governor moves an insulated slide 26 containing contact terminals 27, 28 and 29 making contacts with a fixed contact terminal 30.

The booster ignition and starting circuit is shown as conductors 25, 25′ and 25″ connected to the battery 23 through the ignition switch 21 for the main engine ignition system 21′ and an auxiliary switch 22 normally closed, but which could be used as a cut-out switch if the booster should fail to function properly.

As shown, conductor 25 is connected through terminals 24 to armature 31, and spring hinge 40 of relay 32 and hence through conductor 25′ to the relay 50 to be described later.

From conductor 25 a conductor 33 is connected to fixed terminal 30. As shown, the fixed terminal 30 is in contact with moveable terminal 28. Moveable terminal 28 is connected through conductor 34 to the relay magnetic coil 35 and through resistance 36 to ground, thus whenever fixed terminal 30 is in contact with moveable terminal 28 and armature is drawn down against the force of the spring hinge 40.

When the armature is down the contact bar 38, insulated from the armature but moveable with it, short circuits terminals 37 and the relay coil is connected to ground by a second parallel circuit through conductor 39.

If in this position the speed of the car is increased to say, above 60 miles per hour but less than 70 miles the slide 26 moves up until the insulated section 41 is opposite the fixed terminal 30.

The armature 31 will, however, remain in the down position due to the circuit from 25 through terminals 37, short circuiting bar 38, conductor 39 coil 35 and resistance 36.

However, if the speed still further increases, to say, 70 miles per hour moveable terminal 29 reaches the fixed terminal 30. In this position the relay coil 35 is short circuited by conductor 33 and conductor 42 and the armature 31 rises under the force of spring 40 opening the booster ignition circuit at terminals 24 stopping the booster.

If in this position the vehicle speed is reduced the armature 31 remains in the raised position until at 60 miles per hour moveable terminal 28 again comes in contact with fixed terminal 30 and the armature 31 is again drawn down.

If the speed is still further reduced until, say, 10 miles per hour, moveable terminal 27 comes in contact with fixed terminal 30 and the armature 31 is again short circuited by conductors 33 and 42 and the armature rises stopping the booster.

If in this position the vehicle speed is increased, moveable terminal 28 will not come in contact with fixed terminal 30 to again draw down the armature 31 until the speed has increased to, say, 12 miles per hour.

The conductor 25′ is connected to the relay 50 and through the terminals 51 to the conductor 25″ leading to the booster ignition system and booster starting circuit 90.

In the drawing relay 50 is shown as controlled by the accelerator pedal 51′. The position of this pedal determines the opening of the main engine throttle and the quantity of gasses flowing through the engine at any given speed and thus the load on the engine. It also controls the vacuum in the intake manifold and other known factors which vary according to accelerator pedal position. As is pointed out in my copending application, the load on the engine could be sensed by such other factors controlled by the accelerator pedal position and would constitute means responsive to the position of the main engine control means.

Accelerator pedal 51′ operates an insulated slide containing a contact terminal 52 connected by conductor 53 to conductor 25′. At substantially fully open throttle position, moveable terminal 52 makes contact with contact terminal 56. If relay 32 is in down position current flows through conductor 57, coil 58 and resistance 59 to ground to draw armature 60 down to the position shown to complete the ignition circuit from the battery to the booster ignition.

The drawing down of the armature 60 also short circuits terminals 61 and through conductor 62 makes a circuit from 25″, coil 58, and resistance 59 to ground so that when the throttle is released from its substantially fully open position and terminal 52 moves from its contact with fixed terminal 56 the relay armature is held in its down position.

It will remain in this down position until either the booster ignition circuit is broken by the operation of the speed relay 32 or the throttle is released to substantially fully closed or idling position when moveable terminal 52 makes contact with fixed terminal 54. If relay 70 is in the down position as shown the relay coil 58 will be short circuited by conductor 63, contacts 64 and conductor 65 allowing the armature 60 to rise under the force of the spring 66′ to open the booster ignition circuit at contact terminals 51.

However, when two way switch 93 is closed as shown to connect conductor 68 to switch 67 relay 70 can only be closed when the shifter rod 66 in the gear box (not shown) is moved into the position for high gear closing the switch 67 so that the current for the magnetic coil 69 can flow to ground through conductor 68. This is to prevent the booster from being stopped each time the throttle is brought to the idling position for shifting gears, in any gear other than high gear.

If after reaching high gear with the throttle in idling position, the accelerator pedal is moved down a short distance until moveable terminal 52 makes contact with fixed terminal 55 a circuit is completed from conductor 25′, conductor 53, conductor 71, coil 69, conductor 68, two way switch 93, switch 67 and shifter rod 66 to ground. If the speed relay 32 is operated to close the booster ignition circuit the armature 72 will be drawn down closing contacts 64. At the same time, terminals 73 are short circuited so that there is a circuit from 25' conductor 74, conductor 75, coil 69, conductor 68, two way switch 93, switch 67 and shifter rod 66 to ground so that moveable terminal 52 can move out of contact with terminal 55 and the armature 72 still remain in the down position.

Thus it can be seen that the booster will not be stopped by the throttle being brought to idling for the purpose of shifting gears, but as soon as the car is in high gear the moving of the throttle to the idling position will stop the booster. This is desirable since if at any time the car was traveling between the speeds of say 10 to 70 miles per hour, with the booster operating and the driver ceases to need the extra power, such as slowing down for traffic or going over the top of a hill, he can let up on the accelerator pedal and stop the booster.

During the shifting of gears, when the booster engine is not stopped, it is necessary to bring the booster engine to idling at the same time the main engine is brought to idling. This could be done by inter-connecting the throttle of the main engine and booster engine by a direct linkage. However, I prefer to use the manifold pressure of the main engine. Referring to the drawing, a section of the intake manifold of the main engine is shown at 80. Cylinder 81 is connected by conduit 82 so that the vacuum in the intake manifold will operate piston 83 against the spring 84 to move the throttle control lever 85 to the closed position, shown in dotted lines, when the vacuum is high in the intake manifold.

Spring 84 could be so proportioned that the booster throttle would reach the full open position when the vacuum in the manifold approached the minimum and to simultaneously reduce the power of both engines as the main engine throttle was closed.

However, if desired, the spring could be given a permanent compression in the extended position shown in which case the booster throttle would not be moved until the throttle of the main engine is say largely closed.

The starting of the booster could be either by an electric starter the details of which are shown in my copending application No. 287,424, or the starting over-running clutch arrangement also shown therein. Using the electric starting means shown in this application; when the circuit 25, 25', and 25'' is energized by the closing of relays 32 and 50, the starting circuit 96 is also energized and relay 94 will be energized, drawing down the starting switch to close a circuit 97 from the battery 23 to the booster starting motor 95. As soon as the booster engine has been started, the vacuum in the booster intake manifold 80' will open the vacuum operated switch 96, opening the circuit from the battery to the starting motor.

If the electric starter were used, it would be desirable to have a second throttle valve in the booster intake riser, normally closed, but which would be gradually opened as soon as the booster starts. As shown, 86 is a solenoid connected by conductor 87 to the booster ignition conductor 25''. Upon energization of conductor 25'' by the control system outlined above, plunger 87' is drawn in opening the booster throttle by means of lever 89 against the action of the dash pot 88. This is the same arrangement shown in my copending application above referred to.

For driving in heavy traffic it would be preferable to make the ground connection for relay 70 dependent on the car exceeding a given speed, say 30 miles per hour. This could be simply arranged by having conductor 68 connected through the two way switch 93 to a second fixed contact terminal 92, corresponding to terminal 30, operating against the contact terminal 91 on the insulated slide. The purpose of switch 93 will be described later. Contact terminal 91 would be mounted similar to contact 28 except that it would have a range from 30 miles per hour to the maximum speed range of the slide operation as determined by the high speed stop on the governor 20. This has been assumed in the above to be 70 miles per hour. This fourth movable contact terminal 91 would be grounded.

With this arrangement relay 70 would be grounded so that it could be drawn to the closed position only when the car speed is above 30 miles per hour. At all speeds below this speed, the booster could not be stopped by the throttle operation when movable terminal 52 was brought into contact with fixed terminal 54, corresponding to the idling position of the throttle for the main engine, since relay 70 could not be operated to draw down the armature 72 to provide a circuit from 25' through conductor 53, conductor 63, contacts 64, conductor 65, to short circuit coil 58 of the throttle controlled relay 50, to allow the armature 60 to rise, opening the booster ignition circuit at contacts 51.

However, above this speed of say 30 miles per hour a ground connection is provided for conductor 68 and relay 70 can be drawn to the closed position whenever movable contact 52 makes contact with fixed contact 55 making a circuit from 25' through conductor 53, conductor 71, coil 69, conductor 68, two way switch 93 to the grounded contact on slide 26 arranged to provide this ground for conductor 68 at all speeds above 30 miles per hour.

Thus with this alternate arrangement a car operating in heavy traffic would not stop the booster each time the accelerator was released, but idle it, until it reached a traffic condition where speeds of 30 miles per hour or more were permissible or unless the speed drops below, say, 10 miles per hour.

Since for normal open country driving the grounding of coil 69 through conductor 68 by means of switch 67, which is closed whenever the car is in high gear, is desirable, and, since in heavy traffic it is desirable to keep the booster operating at all speeds below say 30 miles an hour, both modes of operation could be provided and the choice left to the driver according to traffic conditions. This could be accomplished by the simple two-way switch 93 which, in one position, would ground relay 70 through conductor 68 and switch 67 whenever the car is in high gear and, with the switch in its second position, would ground relay 70 through conductor 68 whenever the car is above, say 30 miles per hour. For normal driving the driver could have the switch to the first position and upon entering the crowded section of a city could turn the switch to its second position.

Having set forth my invention, I claim:

1. In combination, a vehicle chassis having a main engine, a control means therefor and propelling means, a secondary booster engine, a clutch for coupling it to the propelling means, a throttle, an ignition circuit, a starting circuit and starting means therefor, and automatic control means responsive to combined speed of a main engine-driven part and the position of said control means for simultaneously energizing said ignition and starting circuits to start the booster engine, open said throttle and engage said clutch, so that the booster engine assists the main engine in driving the vehicle and means connected with the booster throttle to operate said throttle in response to the operation of said main engine control means to continuously operate the booster throttle either towards the closed or open position as the main engine control means is moved towards no power or full power position and thereby continuously control the power output of the booster engine in accordance with the power output of the main engine.

2. In combination, in a vehicle having a main engine, control means therefor, a transmission, vehicle drive means, a booster engine, a clutch for connecting it to said drive means, starting and ignition circuits therefor and control means therefor, comprising a first control mechanism responsive to the speed of the vehicle, a second control mechanism responsive to the position of said main engine control means, said starting and ignition circuits being energized only upon actuation of both said mechanisms and means associated with said second control mechanism to cause it to de-energize said ignition system thereby stopping the booster upon movement of said engine control means to substantially no power position when the transmission is in high gear and means in said last mentioned means associated with said transmission to prevent said second control mechanism from stopping the booster in lower gears.

3. The control means of claim 2 further characterized in the provision of means in said speed control mechanism to prevent the booster from operating below a predetermined minimum vehicle speed to thereby prevent the booster from delivering its torque in the range of speed of low gear operation of said vehicle.

4. The control means of claim 2 further characterized in the provision of means in said speed control mechanism to prevent the booster from operating above a predetermined maximum vehicle speed to thereby prevent excessive speed of said booster engine.

5. In a vehicle, a main engine, a control means therefor, a transmission and drive means for said vehicle, a booster engine, means for connecting said booster engine to said drive means, an overrunning clutch in said connecting means operative to effect clutching engagement only when said booster engine comes up to synchronous speed and means responsive to the position of said main engine control means and the speed of a main engine driven element for starting the booster engine and bringing it up to synchronous speed and means responsive to the position of said main engine control means for controlling the booster engine during booster operation and means for stopping the booster when the transmission is in high gear and said main engine control means is moved to substantially closed throttle position.

6. The combination, in a vehicle having a main engine, control means therefor, vehicle drive means and a booster engine, a throttle for said booster engine, a clutch for connecting it to said drive means, starting and ignition circuits therefor, and control means therefor comprising a first control mechanism responsive to the position of said main engine control means, a second control mechanism responsive to predetermined speeds of a main engine driven element, said starting and ignition booster engine circuits being only energized upon actuation of both said mechanisms to start said booster and clutch it to said drive means, means in said second control mechanism to stop and prevent booster operation above a predetermined maximum speed, means associated with said main engine control means to stop and disconnect said booster and means for cutting out operative functioning of said last means whereby stopping of the booster is dependent solely upon said second control mechanism, and means for rendering said last means inoperative below a second and lower predetermined speed whereby operation of said main engine control means can stop and disconnect the booster only during the range of booster operation between said lower and maximum predetermined speeds.

7. The control means of claim 6 further characterized in the provision of means controlled by the position of the main engine control means for bringing the booster engine up to full load whenever the main engine is operating under load and for idling the booster engine whenever the main engine is idled during the period of operation of the booster engine below said lower predetermined speed.

8. The control means of claim 6 further characterized by means responsive to a predetermined position of said main engine control means for controlling the throttle of the booster engine when the starting circuit thereof is energized.

9. The combination of claim 6 further characterized in the provision of means preventing operative connection of the booster engine into the drive means until the booster engine is at synchronous speed.

10. In combination, a vehicle having an engine including separate sets of cylinders and control means therefor, a crankcase, two crankshafts therein each independently driven, vehicle drive means, clutching means operable so that said sets of cylinders can jointly deliver their power to said drive means, the cylinders driving one of said crankshafts being operator controlled by a manual control means therefor, and the cylinders driving the other of said crankshafts being automatically controlled according to the position of said manual control means for bringing said automatically controlled crankshaft into operation and clutching it to the vehicle drive means.

11. In combination, a vehicle chassis having a main engine, a control means therefor, a transmission and propelling means, a secondary booster engine, a clutch for connecting it to the propelling means, and automatic means controlled jointly by the speed of a main engine driven part and the position of said main engine control means for controlling the connection or disconnection of the booster engine to the propelling means, said control means being operative after the booster is once connected to prevent said means controlled by the position of said main engine control means from disconnecting said booster during the operation of shifting gears of said transmission, but will operate to disconnect the booster when the gears of the transmission are in their normal high speed driving position.

12. In combination, a vehicle chassis having a main engine, a control means therefor, a transmission and a propelling means, a secondary booster engine, a clutch for connecting it to the propelling means and automatic means responsive to the position of said main engine control means for controlling the connection and disconnection of the booster engine to said propelling means, said automatic means including means for preventing the booster engine after once connected from disconnection from the propelling means during shifting through low gears of said transmission by the operation of said means responsive to the position of said main engine controlled means, but permitting disconnection by the operation of said means responsive to the position of said main engine control means when the gears in the transmission are in their normal high speed driving position and the power of the booster is not required.

13. In combination, a vehicle chassis having a main engine, a control means therefor, a transmission and propelling means, a secondary booster engine normally at rest, a clutch for connecting it to the propelling means, starting means for said booster engine, and automatic means responsive to the position of said main engine control means for controlling the starting of said booster engine from rest and connecting it to the propelling means and also for disconnecting and stopping the booster engine, said automatic means including means for preventing the booster engine from disconnection and stoppage while shifting through low gears of said transmission by the operation of said means responsive to the position of said main engine control means, but permitting disconnection and stoppage by the operation of said means responsive to the position of said main engine control means when the gears of the transmission are in their normal high speed driving position and the power of the booster is not required.

14. In combination, a vehicle chassis having a main engine, a control means therefor and a propelling means, a secondary booster engine, a clutch for connecting it to the propelling means and automatic means responsive to the position of said control means of said main engine for controlling the connection of the booster engine to said propelling means, means in said automatic means for permitting the disconnection of the booster engine from the propelling means by operation of said control means, said automatic means responsive to the position of said control means including means, once the booster engine is connected, for preventing said disconnecting means from disconnecting said booster engine by the operation of said means responsive to the position of the main engine control means until the vehicle has attained a predetermined speed and permitting disconnection when the vehicle has passed said predetermined speed.

15. In combination, a vehicle chassis having a main engine, a control means therefor and propelling means, a secondary booster engine normally at rest, a clutch for connecting it to the propelling means, starting means for said booster engine, and automatic means responsive to said control means of said main engine for controlling the starting of said booster engine from rest and connecting it to the propelling means, means in said automatic means for permitting the disconnection of the booster engine from the propelling means by operation of said control means, said automatic means responsive to the position of the control means of said main engine control means including means, once the booster engine is started and connected, for preventing said disconnecting means from disconnecting and stopping said booster engine by the operation of said means responsive to the position of the main engine control means until the vehicle has attained a predetermined speed and permitting disconnection when the vehicle has passed said predetermined speed.

16. In combination, a vehicle having a main engine, a control means therefor and propelling means, a secondary booster engine a clutch for connecting it to the propelling means and automatic means controlled jointly by the speed of a main engine driven part and the position of the main engine control means for controlling the connection of the booster engine to the propelling means; said speed control providing a speed range for said booster and means in said automatic means for permitting the disconnection of the booster engine from the propelling means by operation of said control means, said automatic means including means, once the booster engine is connected, for preventing said means responsive to the position of the main engine control means from disconnecting said booster until the vehicle has attained a predetermined speed within the speed range of said booster engine and permitting disconnection thereafter in said speed range above said predetermined speed.

17. The combination of claim 1 further characterized by an intake manifold for said main engine and wherein said means operable in response to the operation of said main engine control means to continuously operate said booster engine throttle comprises a vacuum cylinder connected to said intake manifold of said main engine, a piston therein connected to said booster throttle, said piston being arranged to be operated by the vacuum in said intake manifold by acting against a spring to continuously move said booster throttle towards closed position as said main engine control means is moved towards no power position and continuously move said throttle towards open position as said main engine control means is moved towards full power position.

FRANK H. BEALL.

REFERENCES CITED

The following references are of record in the file of this patent:

UNITED STATES PATENTS

| Number | Name | Date |
|---|---|---|
| 902,692 | Sherman | Nov. 3, 1908 |
| 1,889,305 | Zerbi | Nov. 29, 1932 |
| 1,080,624 | Diesel | Dec. 9, 1913 |
| 1,768,530 | Short | June 24, 1930 |
| 1,971,998 | Valentine | Aug. 28, 1934 |
| 891,350 | Mascord | June 23, 1908 |
| 1,121,114 | Moore | Dec. 15, 1914 |

FOREIGN PATENTS

| Number | Country | Date |
|---|---|---|
| 127,644 | British | June 12, 1919 |
| 332,301 | German | Jan. 28, 1921 |
| 538,633 | British | Aug. 11, 1941 |